Jan. 17, 1950
G. F. WETZEL
2,494,787
PISTON RING EXPANDER
Filed April 15, 1947
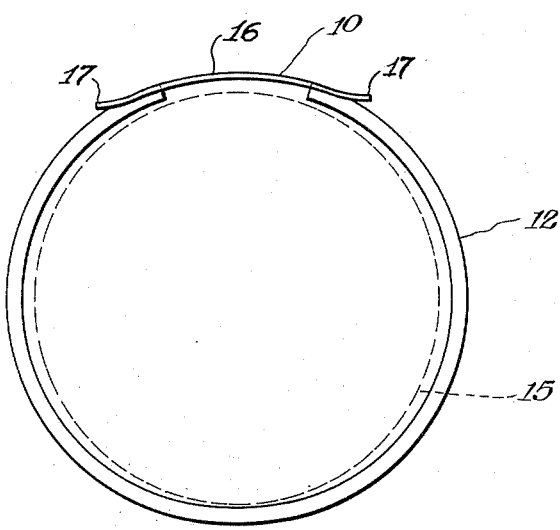
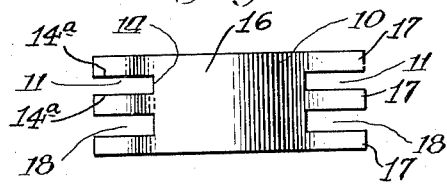
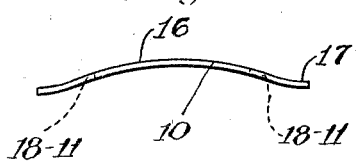
INVENTOR.
Guy F. Wetzel
BY Bair & Freeman
Attorneys Patented Jan. 17, 1950

2,494,787

UNITED STATES PATENT OFFICE 2,494,787

PISTON RING EXPANDER

Guy F. Wetzel, Park Ridge, Ill.

Application April 15, 1947, Serial No. 741,576

2 Claims. (Cl. 29—222)

The present invention relates to a tool for use in connection with a piston ring, for maintaining it in an expanded condition to enable the ring to be quickly and easily telescoped over a piston for placement in a cooperating seat or groove formed in the outer wall of the piston.

There has heretofore been proposed various tools and apparatus for use in expanding piston rings for the purpose indicated, and in the main, such tools and apparatus heretofore available have not been found entirely satisfactory and practical, and are comparatively expensive. In the use of prior types of tools and apparatus of this general order, it is noted that the constructions are such that there is always a tendency for the tension built up in the ring, when the ring is expanded, to rotate the tool and thus cause portions of the ring to be disposed out of alignment.

One of the objects of the present invention is to provide a novel piston ring expander which, in addition to providing usual abutment shoulders or surfaces, engageable with the ends of the ring or holding the ring in expanded position, also is constructed and arranged so as to provide guide surfaces, adapted to co-act with either or both transverse faces of the ring, adjacent the ends thereof, for maintaining the ring in comparatively true alignment while the ring remains in expanded condition.

Another object is to provide an improved tool of the character indicated which is formed as a single element, in elongated form, having a pair of aligned abutment shoulders at opposite ends thereof for engaging the ends of the piston ring for maintaining the latter in expanded condition, and wherein the portion of the expander element, intermediate the abutment shoulders, is bent in an outwardly direction so as to provide adequate clearance in the use of the tool in applying rings to pistons of a relatively wide range of diameters.

A further object is to provide an improved tool of the character indicated, formed as a sheet metal stamping in generally elongated form and having one or more sets of aligned notches at opposite ends thereof to permit use of the tool with rings of different thicknesses, and the notches being formed to provide abutment shoulders to engage the ends of the ring to maintain the latter in expanded condition, together with one or more guide surfaces engageable with transverse faces of the ring to maintain the ring in relatively true alignment while in expanded condition.

Still another object is to provide a novel piston ring expander which is relatively simple in construction, efficient in use, and capable of being manufactured at extremely low cost.

Other objects and advantages of this invention will be apparent from the following description taken in connection with the accompanying drawing in which:

Figure 1 is a plan view of a piston ring provided with the novel expander tool embodying the present invention; and Figures 2 and 3 are face and edge views, respectively, of the novel expander tool.

The piston ring expander, embodying the present invention, comprises an elongated body 10, preferably, though not essentially, formed as a sheet metal stamping. Said body is of generally rectangular form, and is provided at opposite ends with a pair of aligned notches 11, adapted to cooperate with a piston ring indicated at 12. Each of the notches includes a transverse abutment shoulder 14, adapted to abut against an end of the piston ring, as may be clearly seen in Figure 1 of the drawing. Said notches also include a pair of spaced apart guide surfaces 14a, disposed normal to the abutment shoulders 14. The guide surfaces of each of the notches are spaced apart a distance slightly greater than the thickness of the piston ring with which the tool is to be used.

In the use of the tool, one of the ends is disposed so that its notch 11 telescopes over an end portion of the piston ring 12, with the transverse abutment shoulder 14, engaging the end of the ring. The ring is then expanded so as to dispose its opposite end in abutting relation with the abutment shoulder 14 of the opposite aligned notch of the tool. The ring thus is sufficiently expanded and maintained in such condition so as to permit it to be quickly and easily slipped or telescoped over a piston, as indicated in dotted lines at 15, for registering the ring with a cooperating groove or seat formed in the outer wall of the piston. When the expander is so connected to the ring, the guide surfaces 14a cooperate with the top and bottom transverse faces of the piston ring and thus maintain the ring in a stabilized condition, in comparatively true alignment, and eliminate any tendency for the tension, built up in the ring in expanded condition, to rotate the tool and cause mis-alignment of portions thereof.

While it has been found relatively satisfactory to produce a tool having only one guide surface 14a, disposed normal to the abutment shoulder 14, it is preferable to employ a notch formation comprising two spaced apart guide surfaces for accommodating the thickness of the ring therebetween, and thus eliminating the necessity of holding the end portions of the ring against the guide surfaces in the process of applying the ring to the piston.

As may be noted in the drawing, the portion of the body indicated at 16, intermediate the notches, is bent in an outwardly direction, and as shown, is curved longitudinally of the body. By virtue of this construction, the intermediate portion of the body is always disposed outside of the normal inner diameter of the ring, and insures adequate clearance when the expanded ring is being telescoped over a piston for proper seating in a groove thereof. This formation of the intermediate portion of the body of the tool is particularly important by reason of the fact that the expander tool is rendered capable of use in conjunction with rings for pistons of a relatively wide range of diameters.

The extreme outer ends of the body, as indicated at 17, adjacent the notches, are curved in an outwardly direction so that when the expanded ring is placed in seated engagement with its groove in the piston, these end portions 17 may be conveniently engaged by the finger or tool, for removing the expander and permitting the ring to contract around the cylinder.

In order that a single expander tool may have an extremely wide range of utility, the body 10 may be of such width as to permit formation therein of several sets or pairs of aligned notches, such as indicated at 18, at opposite ends thereof, and wherein these notches are of a size as to permit use of the tool in connection with piston rings of a greater thickness.

While I have herein shown a tool provided with two sets of aligned notches, it will be apparent that if desired, the tool may be formed with several sets so as to take care of a relatively wide range of piston rings of different thickness. When, however, the notches are formed with a single guide surface, a single set of aligned notches will permit efficient use of the tool with rings of a wide range of thicknesses.

It is to be understood that the word "notch" as used in the claims, is intended to be accorded a meaning which will comprise an expander tool wherein a single guide surface is associated with a transverse abutment shoulder, as well as a construction as disclosed in the drawing, comprising a pair of spaced-apart guide surfaces in association with an abutment shoulder.

Although I have herein shown and described a preferred embodiment of my invention, manifestly it is capable of modification without departing from the spirit and scope thereof. I do not, therefore, wish to be understood as limiting this invention to the precise form herein disclosed, except as I may be so limited by the appended claims.

I claim as my invention:

1. A piston ring expander comprising, an elongated body having a notch at each end, said notches being aligned longitudinally with respect to each other, each notch having a transversely extending shoulder at its inner end, and an outwardly extending surface normal to said shoulder, said expander being adapted to be inserted between the ends of an expanded piston ring with the ends of the ring received in said notches and abutting respective ones of said shoulders, said guide surfaces adapted to abut one of the transversely disposed faces of the ring adjacent the respective ends of the ring, said guide surfaces having substantial length whereby to maintain the end portions of the ring in alignment with respect to each other while the ring is in expanded condition, a longitudinally intermediate portion of said body being curved outwardly away from the axis of the ring and being curved about an axis parallel with the axis of the ring, said curvature insuring clearance for the ring and expander in placing the ring over a piston, one end of said body being bent outwardly in a direction away from the outer surface of the ring, for engagement by a finger for removing the expander from engagement with the ring.

2. A piston ring expander comprising, an elongated body comprised of a sheet metal stamping and being of relatively thin material, said body having a notch at each end, said notches being aligned longitudinally with respect to each other, each notch having a transversely extending shoulder at its inner end, and a pair of spaced apart, outwardly extending guide surfaces normal to said shoulder, said expander being adapted to be inserted between the ends of an expanded piston ring with the ends of the ring received in said notches and abutting respective ones of said shoulders, said guide surfaces adapted to abut the top and bottom faces of the ring adjacent the respective ends of the ring, said guide surfaces having substantial length whereby to maintain the end portions of the ring in alignment with respect to each other while the ring is in expanded condition, a longitudinally intermediate portion of said body being curved outwardly away from the axis of the ring and being curved about an axis parallel with the axis of the ring, said curvature insuring clearance for the ring and expander in placing the ring over a piston, the thinness of said body enabling the expander to be positioned adjacent the outer peripheral face of the ring and away from the inner face of the ring, whereby additional clearance is insured for the ring and expander in placing the ring over the piston, one end of said body being bent outwardly in a direction away from the outer surface of the ring, for engagement by a finger for removing the expander from engagement with the ring.

GUY F. WETZEL.

REFERENCES CITED

The following references are of record in the file of this patent:

UNITED STATES PATENTS

| Number | Name | Date |
|---|---|---|
| 131,096 | Guthrie | Sept. 3, 1872 |
| 1,508,287 | Moran | Sept. 9, 1924 |
| 1,770,621 | McElwee | July 15, 1930 |
| 1,989,987 | Johnson | Feb. 5, 1935 |
| 2,133,752 | Meyer et al. | Oct. 18, 1938 |